United States Patent
Jung et al.

(10) Patent No.: US 11,862,824 B2
(45) Date of Patent: Jan. 2, 2024

(54) FUEL CELL SYSTEM AND METHOD OF CONTROLLING SAME

(71) Applicants: Hyundai Motor Company, Seoul (KR); Kia Corporation, Seoul (KR)

(72) Inventors: Jae Won Jung, Suwon-si (KR); Hak Yoon Kim, Incheon (KR); Jun Young Park, Suwon-si (KR); Seong Cheol Jeong, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 15 days.

(21) Appl. No.: 17/409,941

(22) Filed: Aug. 24, 2021

(65) Prior Publication Data

US 2022/0190363 A1    Jun. 16, 2022

(30) Foreign Application Priority Data

Dec. 15, 2020    (KR) .......................... 10-2020-0175426

(51) Int. Cl.
*H01M 8/04119* (2016.01)
*H01M 8/04858* (2016.01)
*H01M 8/04746* (2016.01)

(52) U.S. Cl.
CPC ..... *H01M 8/04179* (2013.01); *H01M 8/0491* (2013.01); *H01M 8/04753* (2013.01)

(58) Field of Classification Search
None
See application file for complete search history.

(56) References Cited

U.S. PATENT DOCUMENTS

| 2008/0220303 A1* | 9/2008 | Yoshida | H01M 8/0488 429/423 |
| 2010/0015484 A1* | 1/2010 | Ishigaki | H01M 8/04402 429/429 |
| 2011/0143234 A1* | 6/2011 | Senner | H01M 8/04753 429/416 |

FOREIGN PATENT DOCUMENTS

KR    1020190000229 A    1/2019

* cited by examiner

*Primary Examiner* — Haroon S. Sheikh
(74) *Attorney, Agent, or Firm* — McDonnell Boehnen Hulbert & Berghoff LLP

(57) ABSTRACT

Proposed are a fuel cell system and a method of controlling the fuel cell system. The fuel cell system includes: a hydrogen supply unit connected to a hydrogen inlet side of a fuel cell stack, with a supply valve and a sensor being provided in the hydrogen supply unit; a hydrogen discharge unit connected to a hydrogen outlet side of the fuel cell stack, with a water trap and a purge valve being provided in the hydrogen discharge unit; and a controller configured to calculate an amount of hydrogen discharged through the purge valve from an amount of hydrogen supplied to the fuel cell stack and an amount of hydrogen consumed therein, and to perform compensation control of the supply valve when the amount of the discharged hydrogen is at or above a reference value.

11 Claims, 4 Drawing Sheets

FUEL CELL SYSTEM AND METHOD OF CONTROLLING SAME

CROSS-REFERENCE TO RELATED APPLICATIONS

The present application claims priority to Korean Patent Application No. 10-2020-0175426, filed Dec. 15, 2020, the entire contents of which is incorporated herein for all purposes by this reference.

TECHNICAL FIELD

The present disclosure relates to a fuel cell system and a method of controlling the fuel cell system, which are capable of estimating an amount of gas discharged in a combined manner when adjusting fuel pressure on the hydrogen electrode side of a fuel cell stack, by performing control of a hydrogen supply valve instead of using a separate sensor, and capable of supplying additional hydrogen in a manner that corresponds to the amount of the discharged gas, in a process of discharging, in a combined manner, condensate water within a water trap and gaseous impurities within a hydrogen electrode of the fuel cell stack. Thus, an overshoot or an undershoot in an amount of supplied hydrogen can be prevented. Accordingly, the efficiency of the fuel cell stack in generating electric power can be increased, and the fuel cell stack can be prevented from degrading.

BACKGROUND

Regarding pressure control for supplying hydrogen to a hydrogen electrode (an anode) of a fuel cell stack, when a system starts to operate, a hydrogen blocking valve is opened, and the pressure control for the hydrogen electrode of the fuel cell stack is performed with control of the degree of opening of the hydrogen supply valve. In this case, it is possible that an amount of supply is adjusted with a PWM duty command to the hydrogen supply valve.

Target pressure for supplying the hydrogen to the hydrogen electrode is set according to an output required of the fuel cell stack. Specifically, when the output required of the fuel cell stack is increased, a flow rate of supplied air is set to be increased, pressure for an air electrode is set to be increased, and the target pressure for the hydrogen electrode is set to be increased.

In addition, a PI control is devised and performed in such a manner that actually measured hydrogen pressure for the hydrogen electrode follows the target pressure.

During the operation, in order to obtain a concentration of the hydrogen, the purge valve is opened for a certain time and purging is performed. At this point, in order to compensate in advance for a drop in pressure due to the discharge of the hydrogen while the purge valve is opened, according to electric current in the fuel cell stack at a point in time when the purge valve is opened, a target value of duty compensation for the hydrogen supply valve is set to be fed forward and is adjusted.

When the purge valve is opened, condensate water within a water trap is discharged, and after the condensate water is completely discharged, the purging of the hydrogen is naturally performed. In a case where a water-level sensor is not provided to reduce the cost of the system, it is difficult to exactly know a point in time for hydrogen discharge and an amount of the discharged hydrogen. Furthermore, there is a problem in that an overshoot or an undershoot in pressure of the supplied hydrogen occurs.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide a fuel cell system and a method of controlling the fuel cell system, which are capable of estimating an amount of gas discharged in a combined manner when adjusting fuel pressure on the hydrogen electrode side of a fuel cell stack, by performing control of a hydrogen supply valve instead of using a separate sensor, and capable of supplying additional hydrogen in a manner that corresponds to the amount of the discharged gas, in a process of discharging, in a combined manner, condensate water within a water trap and gaseous impurities within a hydrogen electrode of the fuel cell stack. Thus, an overshoot or an undershoot in an amount of supplied hydrogen can be prevented. Accordingly, the efficiency of the fuel cell stack in generating electric power can be increased, and the fuel cell stack can be prevented from degrading.

According to an aspect of the present disclosure, there is provided a fuel cell system including: a hydrogen supply unit connected to a hydrogen inlet side of a fuel cell stack, with a supply valve and a sensor being provided in the hydrogen supply unit; a hydrogen discharge unit connected to a hydrogen outlet side of the fuel cell stack, with a water trap and a purge valve being provided in the hydrogen discharge unit; and a controller configured to calculate an amount of hydrogen discharged through the purge valve from an amount of hydrogen supplied to the fuel cell stack and an amount of hydrogen consumed therein, and to perform compensation control of the supply valve when the amount of the discharged hydrogen is at or above a reference value.

In the fuel cell system, the sensor may be a pressure sensor and may be provided between the supply valve and an ejector.

In the fuel cell system, the purge valve may be provided underneath the water trap, and when the purge valve is opened, condensate water within the water trap may be first discharged, and then hydrogen may be discharged.

In the fuel cell system, the controller may calculate the amount of the supplied hydrogen from pressure of the supplied hydrogen, which is measured through the sensor, or from a flow rate of the hydrogen.

In the fuel cell system, the controller may calculate the amount of the consumed hydrogen from electric current that is output from the fuel cell stack.

In the fuel cell system, the controller may calculate the amount of the discharged hydrogen by subtracting the amount of the consumed hydrogen from the amount of the supplied hydrogen.

In the fuel cell system, the controller may calculate the amount of the discharged hydrogen from the amount of the supplied hydrogen, the amount of the consumed hydrogen, and an amount of hydrogen pressurized in the fuel cell stack.

In the fuel cell system, the controller may calculate the amount of the pressurized hydrogen from internal pressure of a hydrogen electrode of the fuel cell stack.

In the fuel cell system, the controller may calculate the amount of the discharged hydrogen by subtracting the amount of the consumed hydrogen and the amount of the hydrogen pressurized in the fuel cell stack from the amount of the supplied hydrogen.

In the fuel cell system, when the amount of the discharged hydrogen is at or above the reference value, the controller may calculate a compensation value from the amount of the discharged hydrogen, and may control the supply valve with a value obtained by adding the compensation value to a control value with which the supply valve is controlled, thereby preventing an undershoot or an overshoot in the amount of the supplied hydrogen.

According to another aspect of the present disclosure, there is provided a method of controlling the fuel cell system described above, the method including: calculating an amount of hydrogen supplied to a fuel cell stack and an amount of hydrogen consumed therein; calculating an amount of discharged hydrogen from the amount of the hydrogen supplied to the fuel cell stack and the amount of the hydrogen consumed therein; determining whether or not the amount of the discharged hydrogen is at or above a reference value, and performing compensation control for the amount of the hydrogen supplied through the supply valve when the amount of the discharged hydrogen is at or above the reference value.

In the method, in the calculating of the amount of the discharged hydrogen, the amount of the discharged hydrogen may be calculated from the amount of the supplied hydrogen, the amount of the consumed hydrogen, and an amount of hydrogen pressurized in the fuel cell stack.

In the method, in the calculating of the amount of the discharged hydrogen, the amount of the discharged hydrogen may be calculated by subtracting the amount of the consumed hydrogen and the amount of the hydrogen pressurized in the fuel cell stack from the amount of the supplied hydrogen.

In the method, in the performing of the compensation control for the amount of the supplied hydrogen, when the amount of the discharged hydrogen is at or above the reference value, a compensation value may be calculated from the amount of the discharged hydrogen, and the supply valve may be controlled with a value obtained by adding the compensation value to a control value with which the supply valve is controlled, thereby preventing an undershoot or an overshoot in the amount of the supplied hydrogen.

With the fuel cell system and the method of controlling the fuel cell system according to the present disclosure, in the process of discharging, in a combined manner, the condensate water within the water trap and the gaseous impurities within the hydrogen electrode of the fuel cell stack, the amount of the gas discharged in a combined manner when adjusting the fuel pressure on the hydrogen electrode side of the fuel cell stack is estimated by performing the control of the hydrogen supply valve instead of using a separate sensor, and additional hydrogen is supplied in a manner that corresponds to the amount of the discharged gas. Thus, the overshoot or the undershoot in the amount of the supplied hydrogen can be prevented. Accordingly, the efficiency of the fuel cell stack in generating electric power can be increased, and the fuel cell stack can be prevented from degrading.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
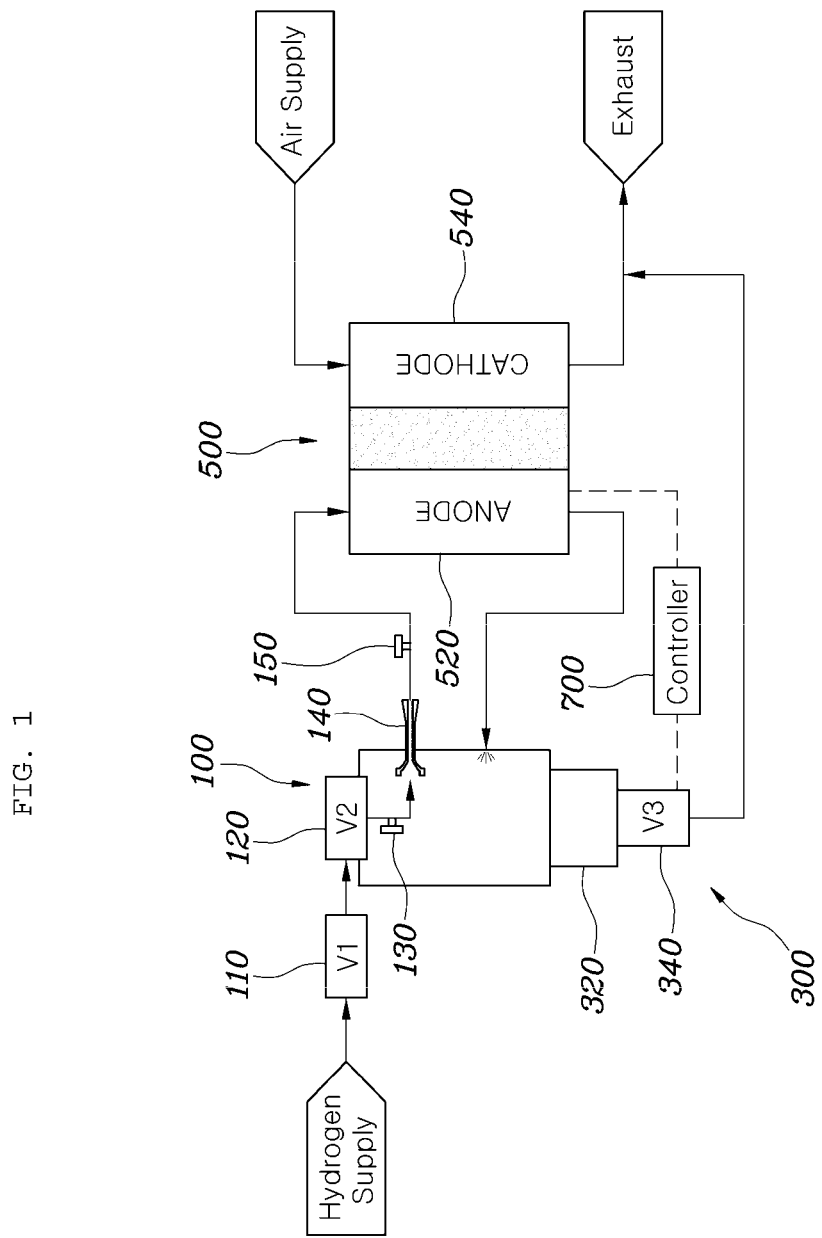
FIG. 1 is a view illustrating a configuration of a fuel cell system according to an embodiment of the present disclosure.
Figure 2:
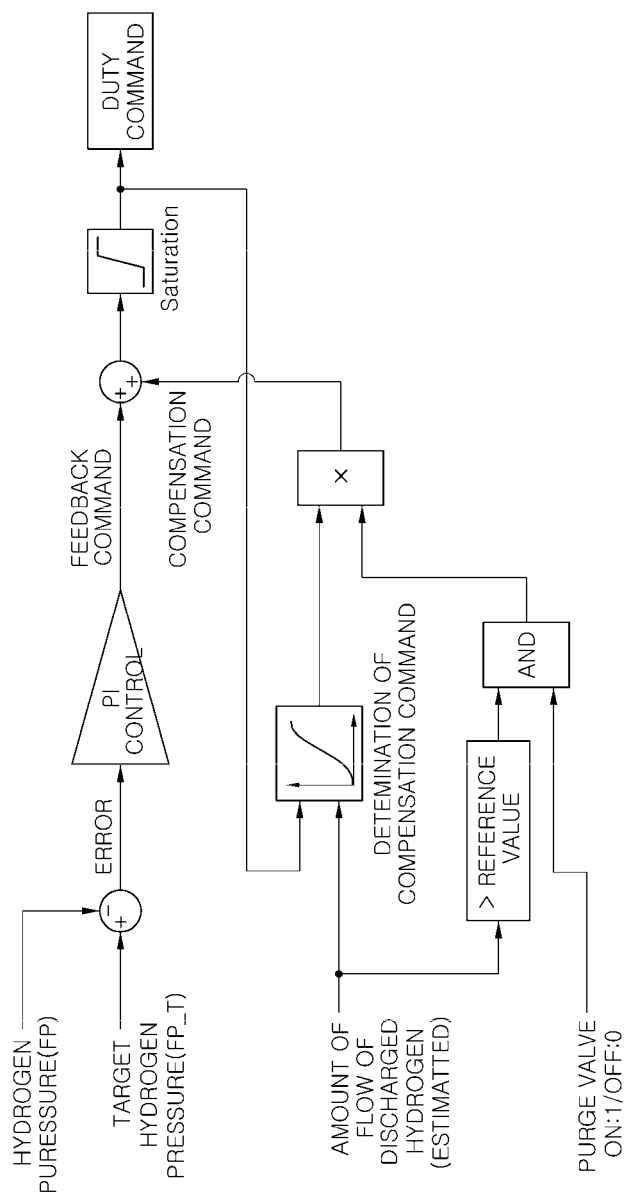
FIG. 2 is a block diagram illustrating control of the fuel cell system according to the embodiment of the present disclosure.
Figure 3:
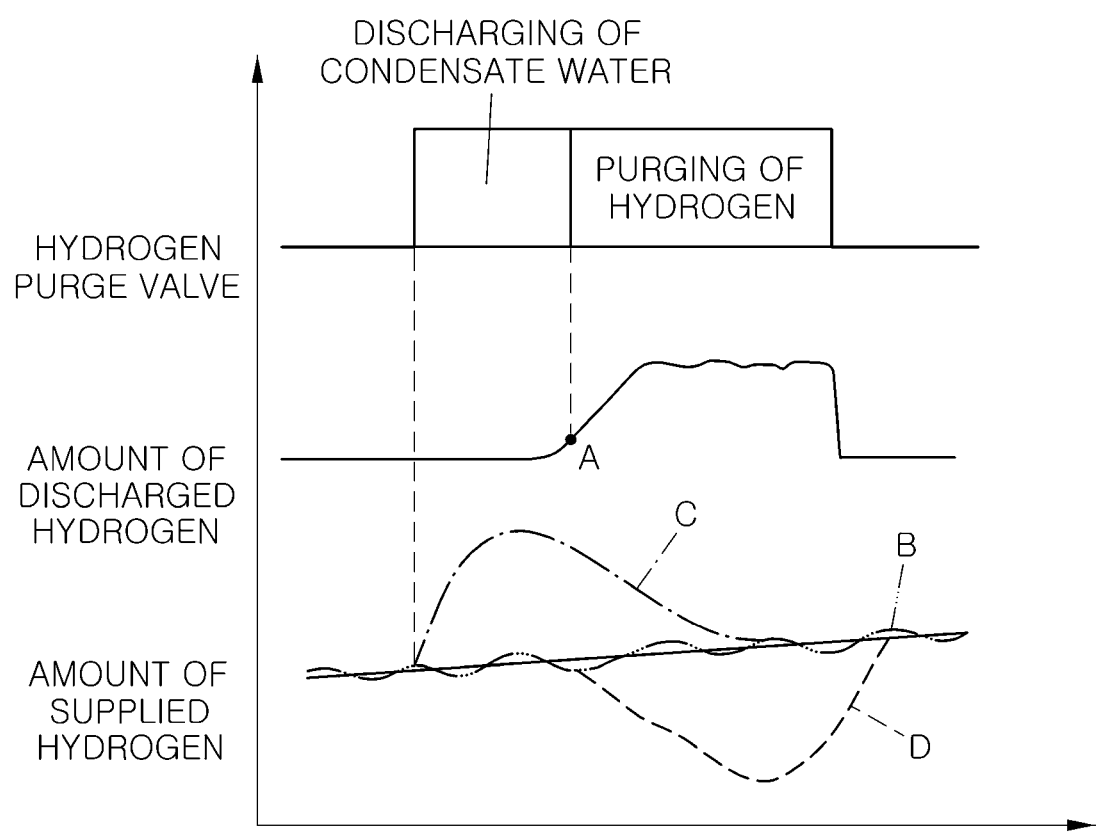
FIG. 3 is a graph illustrating results of the control of the fuel cell system according to the embodiment of the present disclosure.
Figure 4:
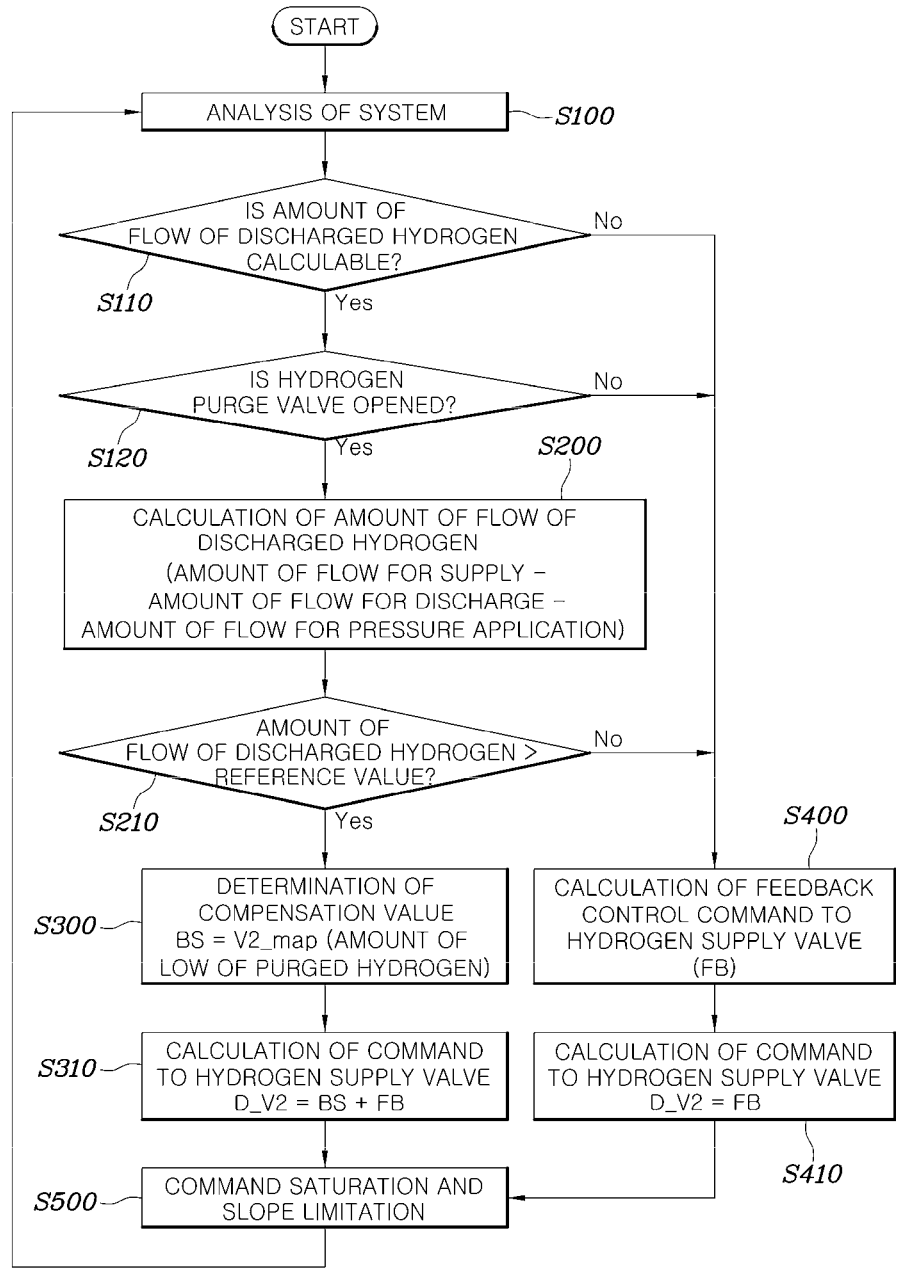
FIG. 4 is a flowchart illustrating a method of controlling the fuel cell system according to the embodiment of the present disclosure.

FIG. 1 is a view illustrating a configuration of a fuel cell system according to an embodiment of the present disclosure. FIG. 2 is a block diagram illustrating control of the fuel cell system according to the embodiment of the present disclosure. FIG. 3 is a graph illustrating results of the control of the fuel cell system according to the embodiment of the present disclosure. FIG. 4 is a flowchart illustrating a method of controlling the fuel cell system according to the embodiment of the present disclosure.

As illustrated in FIG. 1 that is the view illustrating the fuel cell system according to the embodiment of the present disclosure, a fuel cell system according to the present disclosure includes a hydrogen supply unit 100, a hydrogen discharge unit 300, and a controller 700. The hydrogen supply unit 100 is connected to the hydrogen inlet side of a fuel cell stack 500. A supply valve 120 and a sensor 130 are provided in the hydrogen supply unit 100. The hydrogen discharge unit 300 is connected to the hydrogen outlet side of the fuel cell stack 500. A water trap 320 and a purge valve 340 are provided in the hydrogen discharge unit 300. The controller 700 calculates an amount of hydrogen discharged through the purge valve 340, from an amount of hydrogen supplied to the fuel cell stack 500 and an amount of hydrogen consumed therein. When the amount of the discharged hydrogen is at or above a reference value, the controller 700 performs compensation control of the supply valve 120.

The fuel cell system according to the present disclosure is no longer equipped with a valve that, in the related art, is required to be provided between the water trap 320 and an outlet of a hydrogen electrode of the fuel cell stack 500, and with a water-level sensor that, in the related art, is required to be provided within the water trap 320. The fuel cell system is a system based on a technology providing the great advantage of simplifying configuration and thus reducing costs and weight.

Specifically, as illustrated in FIG. 1, hydrogen and air are supplied to a hydrogen electrode 520 and an oxygen electrode 540, respectively, of the fuel cell stack 500. Thus, water is generated, and electric current is produced. The remaining hydrogen is discharged through the purge valve 340 of the hydrogen discharge unit 300.

Pressure needs to be adjusted to supply the hydrogen. A blocking valve 110 is provided to be positioned directly upstream from the supply valve 120. The blocking valve 110 is an on/off valve. The flow rate of a fluid passing through the supply valve 120 is controlled through a PWM control.

Therefore, according to the present disclosure, the hydrogen supply unit 100 is connected to the hydrogen inlet side of the fuel cell stack 500. The supply valve 120 and the sensor 130 are provided in the hydrogen supply unit 100. The sensor 130 is a pressure sensor and is provided between the supply valve 120 and an ejector 140. A sensor 150 is additionally provided to measure pressure of the hydrogen electrode.

The hydrogen discharge unit 300 is connected to the hydrogen outlet side of the fuel cell stack 500. The water trap 320 and the purge valve 340 are provided in the hydrogen discharge unit 300. The purge valve 340 is provided underneath the water trap 320 and has a structure where, when the purge valve 340 is opened, condensate water within the water trap 320 is first discharged due to gravity, where a flow path is formed thereafter, and where inside hydrogen is then discharged. Therefore, in a case where the water-level sensor is not provided, it is very important to precisely measure a point in time when the condensate water is all discharged and a point in time when the hydrogen starts to be discharged.

To this end, the controller 700 calculates the amount of the hydrogen discharged through the purge valve 340, from the amount of the hydrogen supplied to the fuel cell stack 500 and the amount of the hydrogen consumed therein. When the amount of the discharged hydrogen is at or above the reference value, the controller 700 performs the compensation control of the supply valve 120.

For reference, the controller 700 according to an exemplary embodiment of the present disclosure is realized as a nonvolatile memory (not illustrated) and a processor (not illustrated). The nonvolatile memory is configured to store algorithms for controlling operations of various components of a vehicle or data on software commands for executing the algorithms. The processor is configured to perform operations described blow using the data stored in the nonvolatile memory. The memory and the processor here are realized as individual chips. Alternatively, the memory and the processor may be realized as a single integrated chip. The processor may be a combination of two or more processors.

As illustrated in FIG. 2 that is the block diagram for illustrating the control of the fuel cell system according to the embodiment of the present disclosure, feedback control is performed with a command to the supply valve 120 in such a manner that FP (measured hydrogen pressure) follows FP T (target hydrogen pressure) that is set according to the degree of output from the fuel cell stack 500.

When the flow rate of the discharged hydrogen exceeds a reference value after the purge valve 340 is opened to perform purging, it is possible that a point in time when purging of the condensate water is completed is determined as a point in time for purging the hydrogen. The flow rate of the discharged hydrogen is calculated by the expression "flow rate for supply−flow rate for discharge−flow rate for pressure application".

After the purge valve 340 is opened, from when the purging of the hydrogen is determined to when the purging is finished, the compensation control is performed with the command to the supply valve 120 in order to additionally supply as much hydrogen as a flow rate of the purged hydrogen. The reason for performing the compensation control is that, without such compensation, there is a likelihood that an excessive pressure undershoot will occur due to the hydrogen discharge.

In addition, when the compensation control is performed too earlier after the purge valve 340 is opened, there is a likelihood that an excessive pressure overshoot will occur due to the compensation made in advance.

Therefore, the controller 700 calculates the amount of the hydrogen discharged through the purge valve 340, from the amount of the hydrogen supplied to the fuel cell stack 500 and the amount of the hydrogen consumed therein. Then, when the amount of the discharged hydrogen is at or above the reference value, the controller 700 performs the compensation control of the supply valve 120.

The amount of the supplied hydrogen is calculated from pressure of the supplied hydrogen, which is measured through the sensor 130, or from the flow rate of the hydrogen.

Then, the controller 700 calculates the amount of the consumed hydrogen from electric current that is output from the fuel cell stack 500. Specifically, it is possible that the amount of the consumed hydrogen is calculated by the following equation.

$$\text{Amount of consumption: } \frac{I \times n}{2F} \text{ (Calculation of an amount of hydrogen consumed due to electric current in a fuel cell)}$$

where I is electric current (a measured value) in the fuel cell, n is the number of cells (a design value) in a fuel cell stack, and F is a Faraday constant.

The controller 700 calculates the amount of the discharged hydrogen by subtracting the amount of the consumed hydrogen from the amount of the supplied hydrogen. More specifically, the controller 700 calculates the amount of the discharged hydrogen from the amount of the supplied hydrogen, the amount of the consumed hydrogen, and an amount of hydrogen pressurized in the fuel cell stack 500.

The amount of the consumed hydrogen here is calculated from the electric current that is output from the fuel cell stack 500. Specifically, it is possible that the amount of the consumed hydrogen is calculated by the following equation.

$$\text{Amount of consumption: } \frac{I \times n}{2F} \text{ (Calculation of an amount of hydrogen consumed due to electric current in a fuel cell)}$$

where I is electric current (a measured value) in the fuel cell, n is the number of cells (a design value) in a fuel cell stack, and F is a Faraday constant.

Then, the controller 700 calculates the amount of the pressurized hydrogen from internal pressure of the hydrogen electrode of the fuel cell stack 500. Specifically, it is possible that the amount of the pressurized hydrogen is calculated by the following equation.

$$\text{Amount of pressurization: } PV=nRT \text{ (Calculation of an amount of hydrogen for generating pressure for an anode)}$$

where V is a volume (a design value) of the anode, P is pressure of the anode (FP is a measured value and FP T is a target value), R is an ideal gas constant, and T is temperature (a measured value) (conversion to absolute temperature) of the anode.

As described above, the amount of the discharged hydrogen is obtained as a result of subtracting the amount of the consumed hydrogen and the amount of the pressurized hydrogen from the amount of the supplied hydrogen. A point in time where the amount of the discharged hydrogen is no longer small but starts to be increased can be seen as a point in time where the condensate water is all discharged and where the hydrogen starts to be significantly discharged.

That is, the controller 700 calculates the amount of the discharged hydrogen by subtracting the amount of the consumed hydrogen and the amount of the hydrogen pressurized in the fuel cell stack 500 from the amount of the supplied hydrogen.

Accordingly, when the amount of the discharged hydrogen is at or above the reference value, the controller 700 calculates a compensation value from the amount of the discharged hydrogen and controls the supply valve 120 with a value obtained by adding the compensation value to a control value with which the supply valve 120 is controlled, thereby preventing the undershoot or the overshoot in the amount of the supplied hydrogen.

As illustrated in FIG. 3 that is the graph illustrating the results of the control of the fuel cell system according to the embodiment of the present disclosure, when the purge valve 340 is opened, the condensate water is first discharged, and then the hydrogen is discharged. Therefore, it is possible that Point A where the amount of the discharged hydrogen is increased is identified from a point in time when the discharging of the condensate water is finished.

Therefore, when the compensation control is significantly performed for the hydrogen that is supplied after Point A, a phenomenon where the undershoot in pressure for supplying the hydrogen occurs momentarily as indicated by Line D can be prevented. Furthermore, the overshoot, as indicated by Line C, which occurs when the compensation control is performed before Point A can be prevented.

Therefore, the pressure of the hydrogen that is supplied with the control according to the present disclosure is controlled in a manner that reliably follows the target pressure as indicated by Line B.

As illustrated in FIG. 4 that is the flowchart illustrating the method of controlling the fuel cell system according to the embodiment of the present disclosure, the method of controlling the fuel cell system according to the present disclosure includes Steps S100, S110, and S120 of calculating the amount of the hydrogen supplied to the fuel cell stack 500 and the amount of the hydrogen consumed therein; Step S200 of calculating the amount of the discharged hydrogen from the amount of the hydrogen supplied to the fuel cell stack 500 and the amount of the hydrogen consumed therein; Step S210 of determining whether or not the amount of the discharged hydrogen is at or above the reference value; and Steps S300 and S310 of performing the compensation control for the amount of the hydrogen supplied through the supply valve 120 when the amount of the discharged hydrogen is at or above the reference value.

In Step S200 of calculating the amount of the discharged hydrogen, the amount of the discharged hydrogen is calculated by subtracting the amount of the consumed hydrogen and the amount of the hydrogen pressurized in the fuel cell stack 500 from the amount of the supplied hydrogen.

Particularly, in Steps S300 and S310 of performing the compensation control for the amount of the hydrogen, when the amount of the discharged hydrogen is at or above the reference value, the compensation value is calculated from the amount of the discharged hydrogen, and the supply valve 120 is finally controlled with the value obtained by adding the compensation value to the control value with which the supply valve 120 is controlled. Thus, the undershoot or the overshoot in the amount of the supplied hydrogen can be prevented. When the amount of the discharged hydrogen is below the reference value, the pressure for supplying the hydrogen is controlled with general feedback control in a manner that follows the target pressure (Steps S400, S410, and S500).

With the fuel cell system and the method of controlling the fuel cell system according to the present disclosure, in a process of discharging, in a combined manner, the condensate water within the water trap 320 and gaseous impurities within the hydrogen electrode of the fuel cell stack 500, an amount of gas discharged in a combined manner when adjusting fuel pressure on the hydrogen electrode side of the fuel cell stack 500 is estimated by performing the control of the supply valve 120 instead of using a separate sensor, and additional hydrogen is supplied in a manner that corresponds to the amount of the discharged gas. Thus, the overshoot or the undershoot in the amount of the supplied hydrogen can be prevented. Accordingly, the efficiency of the fuel cell stack 500 in generating electric power can be increased, and the fuel cell stack 500 can be prevented from degrading.

Although the specific embodiment of the present disclosure has been described for illustrative purposes, those skilled in the art will appreciate that various modifications, additions, and substitutions are possible, without departing from the scope and spirit of the invention as disclosed in the accompanying claims.

What is claimed is:

1. A fuel cell system comprising:
   a hydrogen supply unit connected to a hydrogen inlet side of a fuel cell stack, with a supply valve and a sensor being provided in the hydrogen supply unit;
   a hydrogen discharge unit connected to a hydrogen outlet side of the fuel cell stack, with a water trap and a purge valve being provided in the hydrogen discharge unit; and
   a controller configured to calculate an amount of hydrogen discharged through the purge valve from an amount of hydrogen supplied to the fuel cell stack and an amount of hydrogen consumed therein, and to perform compensation control of the supply valve when the amount of the discharged hydrogen is at or above a reference value,
   wherein the controller calculates the amount of the discharged hydrogen from the amount of the supplied hydrogen, the amount of the consumed hydrogen, and an amount of hydrogen pressurized in the fuel cell stack,
   wherein the controller calculates the amount of the pressurized hydrogen from internal pressure of a hydrogen electrode of the fuel cell stack, and
   wherein when the amount of the discharged hydrogen is at or above the reference value, the controller determines a compensation value based on a hydrogen purge map from the amount of the discharged hydrogen, and controls the supply valve with a value obtained by adding the compensation value to a control value with which the supply valve is controlled, thereby preventing an undershoot or an overshoot in the amount of the supplied hydrogen.

2. The fuel cell system of claim 1, wherein the sensor is a pressure sensor and is provided between the supply valve and an ejector.

3. The fuel cell system of claim 1, wherein the purge valve is provided underneath the water trap, and when the purge valve is opened, condensate water within the water trap is first discharged, and then hydrogen is discharged.

4. The fuel cell system of claim 1, wherein the controller calculates the amount of the supplied hydrogen from pressure of the supplied hydrogen, which is measured through the sensor, or from a flow rate of the hydrogen.

5. The fuel cell system of claim 1, wherein the controller calculates the amount of the consumed hydrogen from electric current that is output from the fuel cell stack.

6. The fuel cell system of claim 1, wherein the controller calculates the amount of the discharged hydrogen by subtracting the amount of the consumed hydrogen from the amount of the supplied hydrogen.

7. The fuel cell system of claim 1, wherein the controller calculates the amount of the discharged hydrogen by subtracting the amount of the consumed hydrogen and the amount of the hydrogen pressurized in the fuel cell stack from the amount of the supplied hydrogen.

8. A method of controlling the fuel cell system according to claim 1, the method comprising:
- calculating an amount of hydrogen supplied to the fuel cell stack and an amount of hydrogen consumed therein;
- calculating an amount of discharged hydrogen from the amount of the hydrogen supplied to the fuel cell stack and the amount of the hydrogen consumed therein;
- determining whether or not the amount of the discharged hydrogen is at or above a reference value; and
- performing compensation control for the amount of the hydrogen supplied through the supply valve when the amount of the discharged hydrogen is at or above the reference value.

9. The method of claim 8, wherein, in the calculating of the amount of the discharged hydrogen, the amount of the discharged hydrogen is calculated from the amount of the supplied hydrogen, the amount of the consumed hydrogen, and an amount of hydrogen pressurized in the fuel cell stack.

10. The method of claim 9, wherein, in the calculating of the amount of the discharged hydrogen, the amount of the discharged hydrogen is calculated by subtracting the amount of the consumed hydrogen and the amount of the hydrogen pressurized in the fuel cell stack from the amount of the supplied hydrogen.

11. The method of claim 8, wherein, in the performing of the compensation control for the amount of the supplied hydrogen, when the amount of the discharged hydrogen is at or above the reference value, a compensation value is calculated from the amount of the discharged hydrogen, and the supply valve is controlled with a value obtained by adding the compensation value to a control value with which the supply valve is controlled, thereby preventing an undershoot or an overshoot in the amount of the supplied hydrogen.

* * * * *